United States Patent Office 2,856,401
Patented Oct. 14, 1958

2,856,401

PROCESS FOR MAKING CELLULOSE ACETATE OF LOW ACETYL VALUE BY HETEROGENEOUS RIPENING

James Wotherspoon Fisher and Harold Bates, Spondon, near Derby, England, assignors to British Celanese Limited, a British company No Drawing. Application July 22, 1955
Serial No. 523,929

Claims priority, application Great Britain August 10, 1954

6 Claims. (Cl. 260—230)

This invention relates to the manufacture of cellulose esters of low acyl value, and in particular to the manufacture of cellulose acetate of low acetyl value.

Cellulose acetate is ordinarily made by acetylating cellulose with acetic anhydride in the presence of a solvent for cellulose acetate, usually either acetic acid or methylene chloride. The reaction is allowed to proceed until the cellulose is more or less completely acetylated and the product, termed cellulose triacetate or primary cellulose acetate, has completely dissolved. The primary cellulose acetate is then partly hydrolysed while still in solution to give a so-called secondary cellulose acetate characterised by being soluble in acetone and usually having an acetyl value between about 52.5% and 56%. (These and all the acetyl values given in this specification are calculated as acetic acid.)

There is another method of making cellulose acetate in which the cellulose is acetylated in the presence of a non-solvent for cellulose acetate, e. g. benzene or toluene, to prevent it dissolving, so that the cellulose triacetate obtained retains the fibrous form of the cellulose. This method, while it can be useful for making cellulose triacetate without the complication of precipitating it from solution, has found little commercial use since it is not feasible to ripen the cellulose triacetate to give an acetone-soluble product without dissolving it and so losing the advantage that precipitation is not required. If attempts are made to hydrolyse the cellulose triacetate without dissolving it, i. e. while maintaining its fibrous form, the products are very heterogeneous and even when their average acetyl value is within the range 52.5% to 56% they will not dissolve in acetone to more than a very small extent and are commercially valueless.

There exists a demand for certain purposes for a cellulose acetate of acetyl value substantially below 52.5%, for instance between about 25% and 47.5%, and especially between 35% and 45%. Such low acetyl products can be obtained by prolonging an ordinary ripening process, but the time required is excessive. For example, whereas by ripening a primary cellulose acetate at 25° C. in the usual way, an acetone-soluble cellulose acetate of acetyl value between about 52.5% and 56% may be obtained in about 18–36 hours, to reduce the acetyl value to 35% may require a further 150–175 hours. Moreover, if the acetyl value is reduced much below 52.5% by simply prolonging the ordinary ripening process, when the cellulose acetate is eventually precipitated it tends to separate in a finely divided form which is difficult to wash and unpleasant to handle.

It has now been found, very surprisingly, that a much more rapid and yet uniform ripening to give products of these low acetyl values can be achieved by treating solid particulate acetone-soluble cellulose acetates with an aqueous strong or fairly strong acid. Moreover, the same method may be used to reduce the acyl value or degree of substitution of other organic acid esters of cellulose, in particular lower fatty acid esters such as cellulose propionate, butyrate, acetate propionate and acetate butyrate.

According to the invention organic acid esters of cellulose having a degree of substitution below 2.25 are obtained by subjecting a cellulose ester of the same organic acid or acids having a degree of substitution between 2.25 and 2.6 in a solid particulate form to the hydrolysing action of an aqueous solution of an acid having a degree of ionisation of at least 0.1, and preferably at least 0.5, measured in normal solution at 18° C.

In what is at present the most important application of the invention, cellulose acetates of acetyl value below 52.5% (i. e. of degree of substitution below 2.25), for instance between 25% and 47.5%, which are soluble in acetone or aqueous acetone, are made by subjecting solid cellulose acetate of acetyl value below about 57%, for example between about 52.5% and 56%, to the action of the aqueous solution of the acid.

It will be convenient to describe the invention in more detail with particular reference to cellulose acetate.

The cellulose acetate may be treated with the aqueous acid in a particulate form in which it has been precipitated from the acetylation solution, e. g. in flake form, or it may be ground so as to reduce its particle size; for example it may be ground to pass a 20–40 mesh screen.

Examples of acids suitable for use in accordance with the invention are sulphuric, nitric and hydrochloric acids, and of these nitric acid is the most effective. The concentration of the acid preferably does not exceed about 12% by weight, and may with advantage be between about 1 and 10%. The amount of the aqueous acid employed should be sufficient to allow the cellulose acetate to be completely immersed; for example, we may use about 6–10 parts by weight of the aqueous acid for each part of cellulose acetate. If desired, the acid may be stirred or otherwise agitated during the ripening in order to cause the reaction to proceed faster, but it has been found very satisfactory simply to allow the cellulose acetate and the acid to stand until the desired amount of hydrolysis has taken place.

The acid may be at room temperature or at a higher temperature, e. g. between about 15° and 75° C., and the higher the temperature, the shorter is the time needed for a given fall in the acetyl value, other things being equal. When the ripening has proceeded as far as is desired, the acid may be run off and the cellulose acetate washed neutral and dried.

By the process of the invention there can readily be obtained cellulose acetates of acetyl value between 25% and 47.5% such as are soluble in acetone/water mixtures containing 20% or more by volume of water. These products can be moulded, and are found to have a remarkable degree of stability; thus even if the starting material is a cellulose acetate that needs to be stabilised by one of the known methods if it is to be satisfactory when used for making moulded articles, cellulose acetates of substantially lower acetyl value obtained from it in accordance with the invention do not as a rule need any stabilisation step. It would appear that the treatment of the invention has the effect of splitting off residual sulphate groups as well as acetyl groups, so that the cellulose acetate of lower acetyl value obtained has a combined sulphuric acid content so low as not seriously to affect its stability. At the same time, the treatment with the acid does not itself cause any serious degradation or drop in the viscosity of the cellulose acetate.

The invention is illustrated by the following examples.

*Example I*

A cellulose acetate of acetyl value 53.9% was made by acetylating cellulose with acetic anhydride using acetic acid to dissolve the cellulose acetate formed and about 14% of sulphuric acid (on the weight of the cellulose) as catalyst, ripening the primary solution so obtained at about 25° C., precipitating, and washing the precipitate free from acid. The washed precipitate was dried and ground to pass a 30 mesh screen, and was then immersed in about 8 times its weight of a 7.5% (by weight) solution of nitric acid at 25° C. for 16 hours. The nitric acid was then run off and the cellulose acetate washed. The washed product had an acetyl value of 46.3%, and dissolved in a mixture of 80 parts by volume of acetone and 20 parts by volume of water to give a clear solution. If the ripening process was carried on for a further 8 hours a product of acetyl value of 40.8% was obtained, which dissolved in a mixture of 70 parts by volume of acetone and 30 parts by volume of water to give a clear solution.

*Example II*

Another portion of the same cellulose acetate of acetyl value 53.9% was ground to pass a 30 mesh screen and then immersed in 7.5% nitric acid at 30% C. for 24 hours, after which it was washed free from acid. The product had an acetyl value of 34.5%, and was soluble in a mixture of equal volumes of acetone and water.

*Example III*

Another portion of the same cellulose acetate was ground and immersed in 2.25% nitric acid at 60° C. for 24 hours, and then washed free from acid. The product had an acetyl value of 27%.

*Example IV*

Another portion of the same cellulose acetate was ground, immersed in 4% sulphuric acid at 60° C. for 24 hours and then washed free from acid. The product had an acetyl value of 47.3% and dissolved in 80/20 (by volume) acetone/water.

*Example V*

Another portion of the same cellulose acetate was ground, immersed in 7.3% hydrochloric acid at 30° C. for 24 hours, and then washed free from acid. The product had acetyl value of 42.1%, and could be dissolved to give a smooth solution in 70/30 (by volume) acetone/water.

Having described our invention, what we desire to secure by Letters Patent is:

1. Process for the manufacture of cellulose acetate of acetyl value (reckoned as acetic acid) between 25% and 47.5%, which comprises subjecting cellulose acetate of acetyl value between 52.5% and 57% in a solid particulate form to the hydrolysing action of a 1–12% aqueous solution of an acid having a degree of ionisation of at least 0.1 measured in normal solution at 18° C.

2. Process according to claim 1, wherein the acid has a degree of ionisation of at least 0.5 measured in normal solution at 18° C.

3. Process according to claim 1, wherein the cellulose acetate is in a particulate form sufficiently fine to pass a 20–40 mesh screen.

4. Process according to claim 1, wherein the cellulose acetate is subjected to the action of a 1 to 10% aqueous nitric acid at a temperature of 15° to 75° C.

5. Process according to claim 1, wherein the cellulose acetate is subjected to the action of a 1 to 10% aqueous sulphuric acid at a temperature of 15° to 75° C.

6. Process according to claim 1, wherein the cellulose acetate is subjected to the action of 1–10% aqueous hydrochloric acid at a temperature of 15°–75° C.

References Cited in the file of this patent

UNITED STATES PATENTS

| | | |
|---|---|---|
| 2,508,013 | Burke | May 16, 1950 |
| 2,588,051 | Sharman et al. | Mar. 4, 1952 |